United States Patent [19]
Narahara
[11] 3,812,523
[45] May 21, 1974

[54] SYSTEM FOR MAGNETICALLY RECORDING AND REPRODUCING TELEVISION SIGNALS

[75] Inventor: Hisaaki Narahara, Tokyo, Japan
[73] Assignee: Sony Corporation, Tokyo, Japan

[22] Filed: Nov. 22, 1972
[21] Appl. No.: 308,664

[30] Foreign Application Priority Data
Nov. 26, 1971 Japan .............................. 46-95501

[52] U.S. Cl. .................................. 358/4, 360/33
[51] Int. Cl. ........................................ H04n 9/02
[58] Field of Search ......... 178/5.4 CD, 5.4 R, 5.4 P, 178/DIG. 3, 5.2 R

[56] References Cited
UNITED STATES PATENTS
3,702,374 11/1972 Numakura ...................... 178/5.2 R
3,700,793 10/1972 Borsuk ........................... 178/5.2 R
3,619,491 11/1971 Fujita ............................ 178/5.4 CD

*Primary Examiner*—Richard Murray
*Attorney, Agent, or Firm*—Lewis H. Eslinger, Esq.; Alvin A. Sinderbrand

[57] ABSTRACT

A television signal-handling system incorporating a one-line interval delay line and subtracter circuit connected to both the input and output of the delay line to form a comb filter for transmitting intergral harmonics of line-frequency signals to eliminate interleaved luminance signals in the chrominance band in video tape recorder apparatus. Switches reconnect the combfitter, when the apparatus is used to play back video signals with intermittently recorded chrominance components, to recreate a continuous chrominance signal by adding the intermittent chrominance components and replicas thereof delayed one line interval.

3 Claims, 4 Drawing Figures

SYSTEM FOR MAGNETICALLY RECORDING AND REPRODUCING TELEVISION SIGNALS

BACKGROUND OF THE INVENTION

1. Field of the Invention

This invention relates generally to a system suitable for recording and for reproducing color television signals, and more particularly it relates to an improvement in such a system wherein selected portions of the color television signal are gated at alternate equal intervals and the gated portions of the color television signal are recorded in a checkered pattern of non-adjacent areas on a recording medium to increase utilization of the recording medium.

2. Description of the Prior Art

In the case where a color television signal is recorded on a magnetic medium by a video tape recorder (which will be referred hereinafter as VTR) that has a rotary magnetic head, a system has been proposed by which the signal is recorded in a succession of parallel tracks on a magnetic medium with little or no clearance between adjacent tracks. This increases the utilization of the available area on the magnetic medium, and the system also provides that the recorded signals can be reproduced with no crosstalk.

In such a system, when a color television signal is recorded on magnetic tape, for example, two magnetic heads are mounted on a rotary body at an angular distance of 180° in a tape guide drum. The angles between the width directions of the magnetic air gaps of the respective magnetic heads and the scanning directions (such angles being referred as head azimuth) are selected to be different from each other in the two heads, and the magnetic tape is transported along a section of a helical path that extends about 180° around the drum. The magnetic heads record the color television signal on the tape in such a manner that the recorded tracks are slanted with respect to the longitudinal direction of the magnetic tape. The heads are normally rotated at a speed such that each track records all of the television signals for one field. For a system having 60 fields per second, the rotational speed is 30 r.p.s.

The luminance signal portion of the composite color television signal is used to angular-modulate a predetermined carrier signal. This angular modulation is normally frequency modulation. At the same time, the chrominance signal portion is frequency-converted to a frequency range lower than its original band and is then gated so as to be recorded on each track intermittently. The gating is timed so that the portion of the chrominance signal recorded on one track is located alongside areas of the adjacent tracks on which no chrominance signal is recorded. That is to say, the portions where the chrominance signal is recorded form a checkered pattern. Such a recorded pattern may be formed, for example, by recording the chrominance signal during odd numbered line intervals in one frame and even numbered line intervals during the next frame, but the alternation between odd and even line intervals depends on the direction of movement of the tape relative to the head and the angle between the tracks and the longitudinal direction of the tape.

Such a system is described in detail in U. S. application Ser. No. 277,815, filed Aug. 3, 1972 and assigned to the same assignee as this application. With that system, if no clearance is left between the adjacent recorded tracks or even if the adjacent recorded tracks are overlapped partially, no crosstalk is generated as to the luminance signal upon reproduction with the use of heads similar to those used during recording due to a so-called azimuth loss since the luminance signal is recorded after being subjected to frequency modulation. However, since the chrominance is frequency-converted to a frequency range lower than its original one, crosstalk is generally apt to be generated upon reproduction. To prevent an interfering signal from being reproduced from the adjacent tracks at the positions corresponding to which no chrominance signal is recorded on the track therebetween, the necessary chrominance signal is only extracted by gating the chrominance signal obtained from the head at alternate line intervals with the result that no crosstalk is produced on the chrominance signal. Thus the utilization of the magnetic tape is much increased.

Upon reproduction, the luminance signal is recovered by angular-demodulation, for example, frequency-demodulation, while the chrominance signal is frequency-reconverted to its original frequency band and is gated at alternate line intervals for the necessary chrominance information to be extracted. The chrominance signal recreated in this manner is combined with a replica thereof that has been delayed by one line interval by a suitable delay means. The combination of the intermittent chrominance signals and delayed replicas is a continuous chrominance signal.

SUMMARY OF THE INVENTION

This invention utilizes the fact that in the system mentioned above delay means are provided for delaying the gated chrominance signal by one line interval and a mixing circuit is provided for combining the gated chrominance signal which is not delayed with the replica thereof delayed by one line interval. According to the present invention, the delay circuit and the mixing circuit are also used in a recording system. The delay means and the mixing circuit are used together as a comb filter (which is so-called a C-type comb filter) for the chrominance signal so as to eliminate high-frequency components of the luminance signal from the chrominance signal to be recorded and hence to avoid a color noise known as cross-color disturbance caused by the high frequency component of the luminance signal being mixed into the chrominance signal so as to appear in a reproduced picture.

It is an object of this invention to provide an improvement in magnetic recording and reproducing systems of the type disclosed in the aforementioned U. S. application Ser. No. 277,815.

Another object of this invention is to provide an improved system for recording and reproducing color television signals on a magnetic medium wherein at least a chrominance signal component is gated at alternate line intervals and is then recorded to achieve increased utilization of the magnetic medium and, in addition, to reproduce a television picture from such a recording but without color noise or so-called a cross-color disturbance, caused by high frequency components of a luminance signal in the chrominance signal frequency band in the NTSC system.

DESCRIPTION OF THE PREFERRED EMBODIMENT

Figure 1:
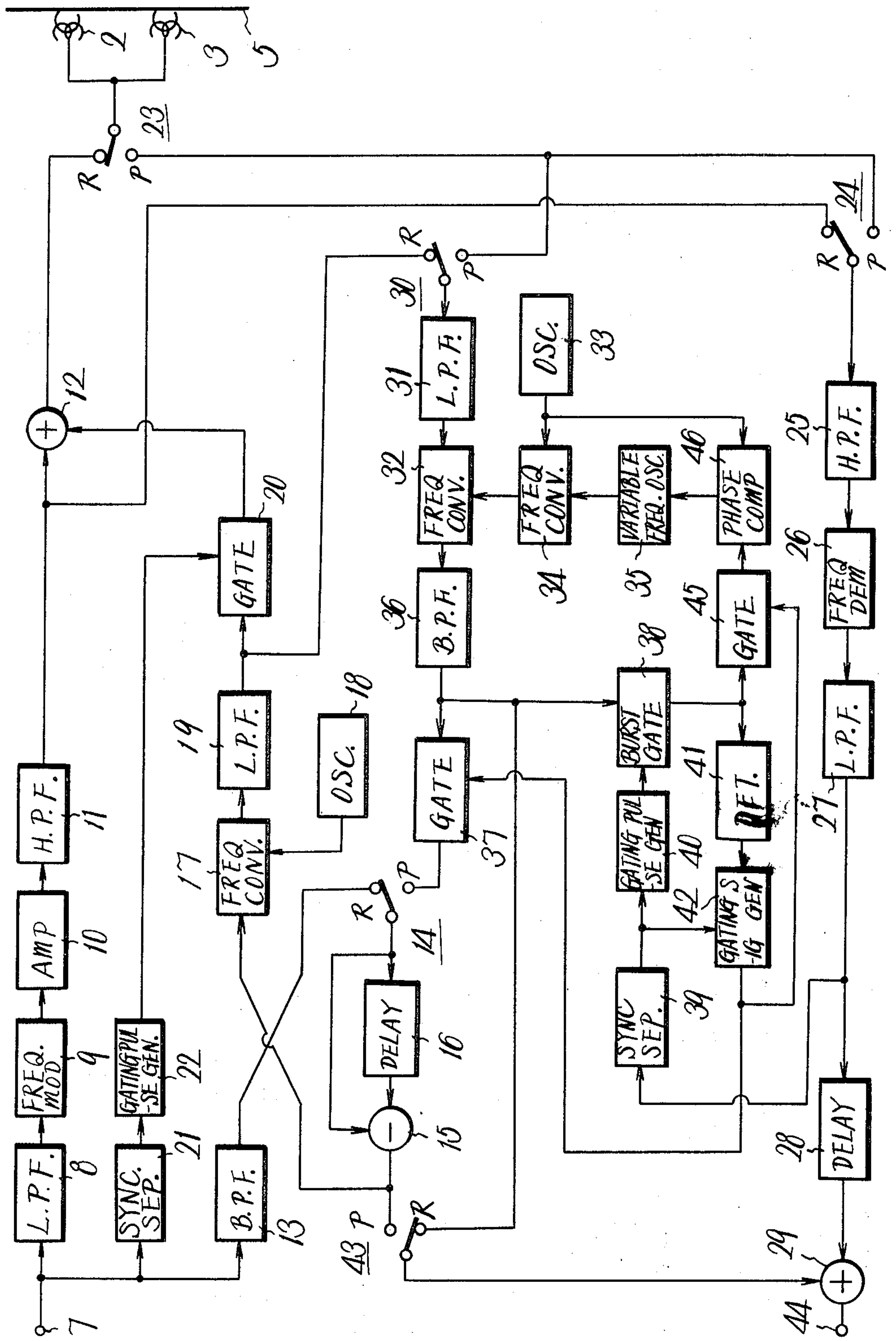
FIG. 1 is a block diagram for showing an example of a magnetic recording and reproducing system according to this invention.

An embodiment of a magnetic recording and reproducing system according to the present invention will be now described with reference to FIG. 1. In the figure, reference numberal 7 designates a color television signal input terminal. A composite color television signal fed to the input terminal 7 is applied to a low-pass filter 8 which passes only the luminance portion of the composite color signal. The separated luminance signal is then applied to a frequency modulator 9 where it frequency-modulates a carrier signal having a predetermined frequency. The frequency-modulated output signal from the frequency modulator 9 is applied through a recording amplifier 10 and a high-pass filter 11 to a mixer 12. The color television signal applied to the input terminal 7 is further fed to a band-pass filter 13 which separates the chrominance portion from the composite color television signal applied thereto. The separated chrominance signal is then applied through the recording contact R of a switch 14 to a subtracter circuit 15 which is also supplied with a chrominance signal delayed by one line interval. The subtracter circuit 15 thus subtracts the chrominance signal from that delayed by one line interval. Consequently, the delay circuit 16 and the subtracter 15 constitute a so-called C-type comb filter, which, in this instance, passes the chrominance signal, while eliminating the luminance signal component in the chrominance band.

Figures 2, 3:
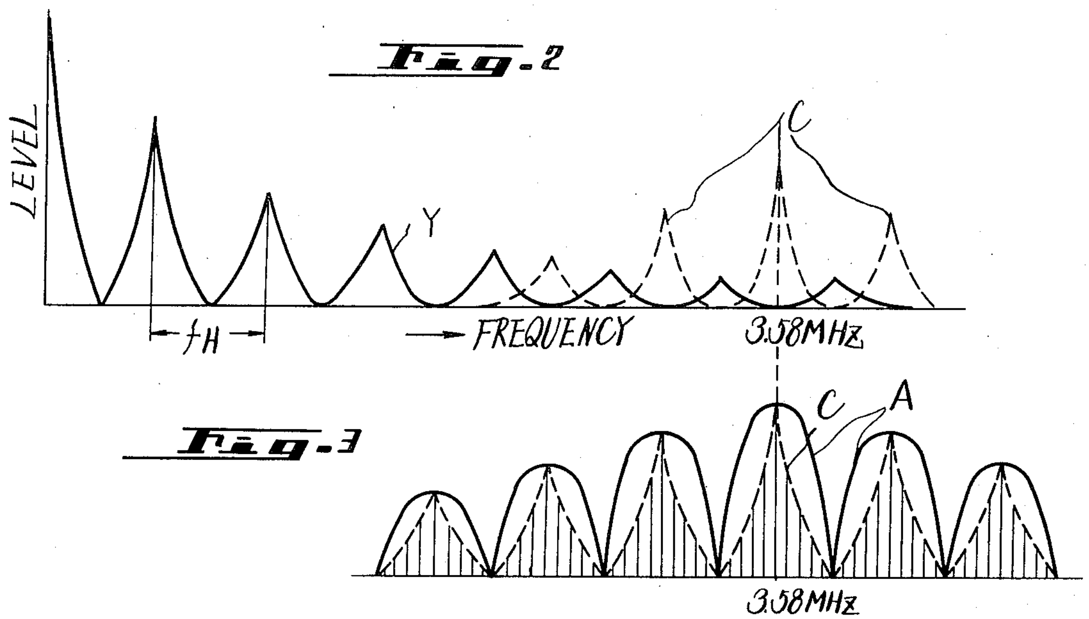
FIGS. 2 and 3 are frequency spectrum diagrams used for explaining this invention.

In the NTSC system, the luminance signal Y and the chrominance signal C are transmitted with a frequency spectrum shown in FIG. 2. In the present invention, the C-type comb filter formed by the delay circuit 16 and the subtracter 15 has a signal pass band characteristic of the type indicated by reference character A in FIG. 3. As a result, the chrominance signal with no luminance signal components is derived from the subtracter 15 and hence the cause for cross-color disturbance in the reproduced picture is eliminated. The chrominance signal derived from the subtracter 15 is then applied to a frequency converter 17 which is also supplied with a signal from an oscillator 18 to frequency-convert the chrominance signal to a lower frequency range the carrier frequency of which is, for example, 560 KHz. The frequency-converted signal passes through a low-pass filter 19 to a gate circuit 20.

Figure 4:
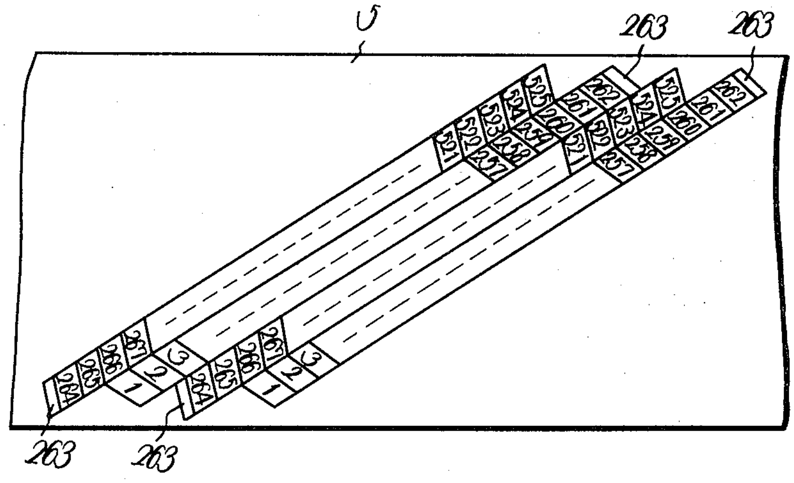
FIG. 4 is a schematic diagram for showing an example of recorded track patterns formed by the system of this invention.

The color television signal fed to the input terminial 7 is further applied to a synchronizing signal separator circuit 21 which separates the synchronizing signal from the composite color signal applied thereto. The separated synchronizing signal is applied to a gating pulse generating circuit 22 that produces a predetermined gate pulse. The gate pulse derived from the circuit 22 is connected to the gate circuit 20 to control the latter so that the chrominance signal frequency-converted to a lower frequency range can pass through only during alternate line intervals. The gated chrominance signal is fed to the mixer 12 to be combined with the frequency-modulated signal that carries the luminance information as mentioned above. The combined signal derived from the mixer 12 is applied through the recording contact R of a switch 23 to magnetic heads 2 and 3 to be recorded on a magnetic medium such as a magnetic tape 5 in the manner described above. The recorded tracks formed on the magnetic tape 5 are shown in FIG. 4. The figures inscribed in blocks of the respective recorded tracks designate line intervals.

When the recorded signal is reproduced, the signals picked up by the heads 2 and 3 are passed through the reproducing contact P of a switch 24 to a high-pass filter 25. The high-pass filter 25 passes the frequency-modulated signal with the luminance information to a frequency demodulator 26. The demodulated signal from the frequency demodulator 26 is filtered by a low-pass filter 27 and is passed along to a delay circuit 28, that delays the reproduced luminance signal in accordance with the delay of the reproduced chrominance signal. From the delay circuit 28 the luminance signal goes to a mixer 29.

The 58 signals from the reproducing contact P of the switch 23 also pass through the reproducing contact P of a switch 30 to a low-pass filter 31, which transmits the frequency-converted chrominance signal band to a frequency converter 32. A signal of 3.58 MHz is applied from an oscillator 33 to a frequency reproduced 34 which is also supplied with a signal of 560 KHz from a variable frequency oscillator 35. Thus, the frequency converter 34 produces a reference signal of 4.14 MHz, which is higher than 3.58 MHz by 560 KHz and which is then fed to the frequency converter 32. The chrominance signal is frequency reconverted in the frequency converter 32 to its original frequency range with a carrier signal of 3.58 MHz. The reconverted chrominance signal passes through a band-pass filter 36 to a gate circuit 37 and to a burst gate 38.

The luminance signal passed through the low-pass filter 27 is also connected to a synchronizing separator circuit 39 which separates out the horizontal synchronizing signal. The horizontal synchronizing signal is applied to a gating pulse generating circuit 40 from which a burst gating pulse is obtained. This burst gating pulse is then applied to the burst gate circuit 38, which produces a burst signal. The burst signal in the recorded track being played back and the undesired burst signals in the recorded tracks adjacent to track are alternately obtained at every line interval. A detector 41 is supplied with the burst signals, both desired and undesired, from the burst gate 38 and discriminates the desired burst signals from the undesired ones by detecting their amplitudes. A gating signal generator 42 is supplied with the output signal from the detector 41 and that from the synchronizing separator 39 and then produces a gate signal which is fed to the gate circuit 37. This signal opens the gate circuit 37 to pass the chrominance signal during alternate line intervals necessary for obtaining the chrominance signal, and closes it during the remaining line intervals to allow the chrominance signal to pass through only at every second line interval. The chrominance signal obtained at every second line interval from the gate circuit 37 is fed through the reproducing contact P of the switch 14 and the delay means 16 for delaying the signal by one line interval to the subtracter 15 which is also supplied with the undelayed chrominance signal from the gate circuit 37 through the reproducing contact P of the switch 14. The subtracter 15 combines the delayed and undelayed signals into a continuous chrominance signal. In this case, one of the chrominance signals applied to the subtractor 15 is reversed in phase with respect to the other, so that the original chrominance signal, the carrier of which is reversed in phase at every line interval, is obtained. The original chrominance signal derived from the subtracter 15 is fed through the reproducing contact P of a switch 43 to the mixer 29 in which the chrominance signal is combined with the luminance signal to recreate the original color television signal. The recreated color television signal is fed to an output terminal 44 from the mixer 29.

In this case, the signal used for frequency-converting the chrominance signal is controlled in phase by the burst signal separated from the reproduced chrominance signal so as to correct a phase error caused by frequency-converting of the chrominance signal. For this purpose, the burst signal from the burst gate circuit 38 is fed to a gate circuit 45 which is also supplied with the gating signal from the gating signal generator 42. Thus, from the gate circuit 45 there is derived the desired burst signal in alternate line intervals. This burst signal from the gate circuit 45 is fed to a phase comparator 46 which is also supplied with the signal from the oscillator 33. The phase comparator 46 thus compares both the signals applied thereto to detect a phase error between them. The output signal from the phase comparator 46 is fed to the variable frequency oscillator 35 to control the frequency of the output signal from the latter, As a result, the reference signal derived from the frequency converter 34 for frequency-converting the chrominance signal is controlled in frequency or phase.

With the embodiment shown in FIG. 1, recording signals can be monitored during recording by use of the circuit for reproducing. This will be now described. The luminance signal passed through the high-pass filter 11 is fed through the recording contact R of the switch 24 to the luminance reproducing circuit from the high-pass filter 25 to the delay circuit 28, and the demodulated luminance signal is fed to the mixer 29. At the same time, the continuous chrominance signal from the filter 19 is passed through the recording contact R of the switch 30 to the chrominance signal reproducing circuit 31 through the delay means 16 and subtracter circuit 15 the return the frequency-reconverted signal to being a continuous signal. From the subtracter circuit the chrominance signal passes that includes the filter 31, the frequency reconverter 32 and the filter 36. Then the chrominance signal passes through the recording terminal R of the switch 43 to the mixer 29. As a result, a color television signal substantially equal to that applied to the input terminal 7 is delivered to the output terminal 44.

With the apparatus of the present invention described above, the utilization of a magnetic tape is improved. The amount of recording on the magnetic medium can be much increased and the cross-color disturbance in the in the reproduced picture can be avoided.

Further, in the present invention the delay means 16 for delaying a signal by one line interval is also used for eliminating the luminance signal component in the band of the chrominance signal during recording. If it were not eliminated, that luminance signal would cause the cross-color disturbance. During playback the same delay means can also be used for obtaining the successive chrominance signal, so that the present invention simplifies construction and allows the price to be reduced as compared with the case where delay circuits are provided for the purposes mentioned above.

The present invention can be also adapted to the case where a signal is recorded on a rotary magnetic sheet and is reproduced therefrom.

What is claimed is:

1. A system for magnetic recording and reproducing of a composite color television signal including luminance and chrominance signal components, said system comprising recording means including A. means for separating the luminance signal and chrominance signal from the composite color television signal;

B. means for frequency-modulating a carrier signal having a predetermined frequency by at least said luminance signal;

C. comb filter means comprising:

1. a delay device having input and output terminals and having a delay time of one line interval, and
2. a subtracting circuit connected to both the input and output terminals of said delay device, said comb filter being supplied, during recording, with said separated chrominance signal to eliminate the luminance signal components contained in the chrominance signal band;

D. means for frequency-converting the chrominance signal to a frequency band lower than its original one;

E. means for gating alternate line intervals of at least said chrominance signal; and F. means supplied with said frequency modulated signal and said gated and frequency-converted chrominance signal for recording both of them on a magnetic medium: and reproducing means including G. means for picking up said frequency-modulated signal and said frequency-converted chrominance signal from said magnetic medium;

H. means for frequency-demodulating said picked-up frequency-modulated signal to produce the luminance signal;

I. means for frequency-reconverting said picked-up frequency-converted chrominance signal to its original frequency band;

J. means for connecting said delay device to produce delayed replicas of the gated line intervals of the chrominance signal reproduced from the magnetic medium;

K. means for connecting said subtracting circuit to combine said gated intervals of the chrominance signal reproduced from the magnetic medium with their replicas to produce a continuous chrominance signal; and L. means for combining the luminance signal from said frequency-demodulating means with said continuous chrominance signal from said subtracting circuit to recreate the original composite color television signal.

2. The system of claim 1 comprising in addition:

A. A first switch to connect said frequency-demodulating means either to said frequency-modulating means, during recording, or to said means for picking up said signals, during reproducing;

B. a second switch to connect said frequency-reconverting means either to said frequency-converting means, during recording, or to said means for picking up said signals, during reproducing; and C. means operative during during recording for combining the output of said frequency-demodulating means with the output of said frequency-reconverting means to provide a color television signal for monitoring during recording.

3. The system of claim 1 in which, during recording, said comb filter is connected in series between said separating means and said frequency-converting means.

* * * * *